Figure 1:
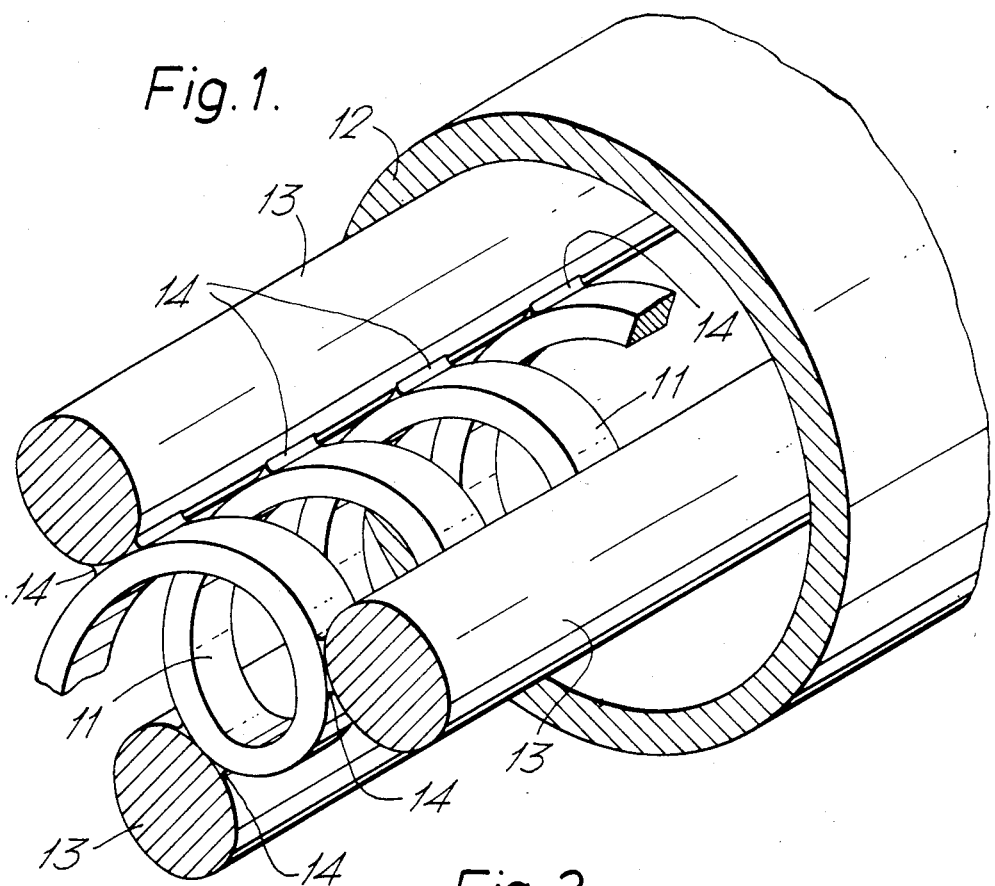

United States Patent [19]

Knapp et al.

[11] Patent Number: 4,645,117
[45] Date of Patent: Feb. 24, 1987

[54] BONDING METAL TO CERAMIC

[75] Inventors: Lionel Knapp; Geral I. E. J. Horrocks, both of Paignton, England

[73] Assignee: Standard Telephone and Cables Public Ltd. Co., London, England

[21] Appl. No.: 617,610

[22] Filed: Jun. 5, 1984

[30] Foreign Application Priority Data

Jun. 17, 1983 [GB] United Kingdom ............... 8316553

[51] Int. Cl.⁴ ............................................. B23K 31/02
[52] U.S. Cl. .................................... 228/124; 228/122
[58] Field of Search ................. 228/122, 124; 445/29; 315/3.5

[56] References Cited

U.S. PATENT DOCUMENTS

| 2,812,499 | 11/1957 | Robertson | 445/29 |
| 3,065,533 | 11/1962 | Dungan et al. | |
| 3,624,678 | 11/1971 | Falce | 445/29 |
| 4,005,329 | 1/1977 | Manoly | 315/3.5 |

FOREIGN PATENT DOCUMENTS

| 1058920 | 6/1959 | Fed. Rep. of Germany . |
| 6613765 | 10/1968 | Netherlands . |
| 735929 | 8/1955 | United Kingdom ............... 228/122 |
| A824552 | 12/1959 | United Kingdom . |

OTHER PUBLICATIONS

Chem. Abstracts, vol. 94, No. 4, p. 235, No. 19355g (1981).
Chem. Abstracts, vol. 87, No. 26, p. 254, No. 121675d (1977).

Primary Examiner—Nicholas P. Godici
Assistant Examiner—Karen Skillman
Attorney, Agent, or Firm—Kerkam, Stowell, Kondracki & Clarke

[57] ABSTRACT

A method of bonding a metal body to a ceramic body, particularly a method of bonding a TWT slow-wave helix to boron nitride support rods, involves depositing on one of the bodies an active metal layer, typically of titanium, to be sandwiched between barrier layers protecting it from oxidation. The assembly is formed and then heated to a temperature sufficient to cause the active metal to migrate into the surface of the ceramic, whereupon the temperature is further raised to cause the protective barrier layers to form a braze uniting the metal body to the now-metallized ceramic body.

6 Claims, 2 Drawing Figures

BONDING METAL TO CERAMIC

This invention relates to bonding metal to ceramic, and find particular application to the bonding of travelling-wave-tube (TWT) slow-wave helices to ceramic support rods in order to improve the extraction of heat from such structures.

A known method of bonding a metal body to a ceramic body, for instance of beryllia or alumina, involves brazing, having first coated the ceramic with a molybdenum manganese paint and fired it. The application of this technique to ceramics made of boron nitride presents particular problems, but this ceramic has properties that otherwise make it attractive for use in high frequency applications. Furthermore the technique gives rise to registration problems when it is desired to bond closely spaced metal surfaces to a ceramic body without producing an electrical short across the ceramic surface. This registration problem is severe for instance in the bonding of a Q-band slow-wave helix to support rods where the pitch of the helix is less than 1 mm.

According to the present invention there is provided a method of bonding a metal body to a ceramic body wherein a first metallic layer is deposited by sputtering upon one of the bodies to cover the bond area, a layer of active metal in elemental form is deposited by sputtering upon the first barrier layer, and a second metallic barrier layer is deposited by sputtering upon the active metal layer; wherein the composition, extent and manner of deposition of the layers is such as to protect the active metal layer from general oxidation; wherein the composition of the barrier layers is such that on their own, or together with material of the active layer, they combine to form a braze that contains at least one of the elements gold, silver, copper, nickel; wherein the composition of the barrier layer on the side of the active metal layer facing the ceramic body is an alloy, selected from the group comprising an alloy, a composite layer whose components constitute the precursor of an alloy, and a layer that forms an alloy with the active metal; wherein the two bodies are assembled and heated in vacuum or in an inert atmosphere to cause at least some of the active metal to migrate through into the ceramic; and wherein further heat is applied to cause the metal of the barrier layers to combine and form a braze joining the metal body to the now metallized ceramic body.

The use of active metal such as titanium or zirconium incorporated into braze metal for metallizing a ceramic body to enable it to be satisfactorily brazed is known as active metal brazing. It is this brazing technique which can with particular advantage be applied to the bonding of a travelling wave tube slow wave helix to its ceramic support rods in order to improve the efficiency with which heat can be extracted from the structure.

Accordingly the present invention also provides a travelling wave tube whose slow wave helix has been brazed to one or more ceramic support rods by active metal brazing.

Figure 2:
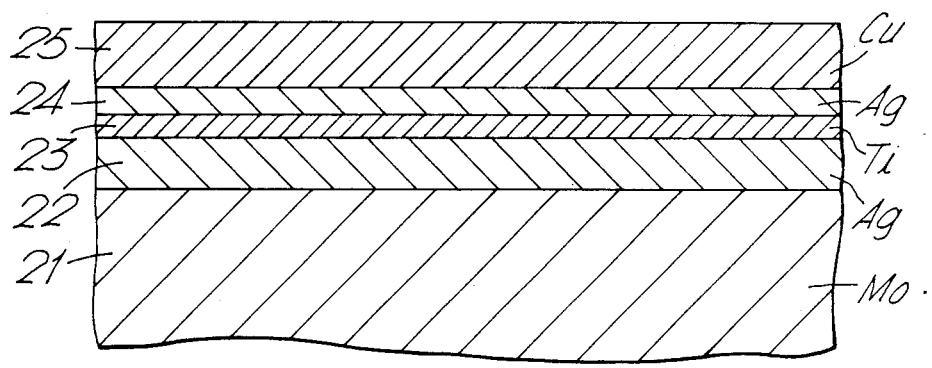

There follows a description of the brazing of a TWT slow-wave helix to a set of boron nitride support rods by a method embodying the invention in a preferred form. This particular method uses titanium as the active metal. The description refers to the accompanying drawings in which:

FIG. 1 depicts a schematic cut-away perspective view of part of the helix and its ceramic support rods, and FIG. 2 depicts a cross-section of part of this helix showing the layers deposited upon the underlying surface of molybdenum.

This particular slow-wave helix 11 is designed for operation in the Q band (26.5 to 40 GHz), and is made of molybdenum and has an overall diameter of 0.94 mm and a pitch of 0.5 mm. This helix is supported centrally within a tube 12 by three boron nitride rods 13 extending in the axial direction, and is secured to these rods by fillets 14 of braze metal. The metal for these fillets is derived from coatings applied to the helix before assembly, and the quantity of metal involved in these coatings is carefully regulated so as to provide sufficient for forming the requisite joints without providing an excess which might otherwise flow along the rods and electrically short any of the helix turns. Referring now more particularly to FIG. 2, the molybdenum 21 of the helix 11 is coated with a first layer 22 of silver, a layer 23 of titanium, a second layer 24 of silver, and finally a layer 25 of copper. The aggregate thickness of these layers, each of which is deposited by sputtering, is typically about 2 microns in order to have adequate metal and avoid an excess. It is relatively easy to regulate the actual thickness of braze metal employed to a tolerance of a few Angstrom units. The sputtering must be performed in a manner which protects the titanium from general oxidation, and it has been found convenient to perform the deposition in an argon atmosphere. The first silver layer 22 on its own serves as the first barrier layer and protects the underside of the titanium layer 23 from oxidation. Similarly the second silver layer 24 protects the topside from oxidation. This second silver layer 24 coacts with the copper layer 25 to form a composite second barrier layer whose components form the precursor to a silver copper alloy. Alternatively this material of layers 24 and 25 could have been sputtered in a co-deposition regime providing a mixed composition layer in the first instance. In this particular instance of providing a braze of substantially eutectic proportions the co-deposited material of layers 24 and 25 will not have eutectic proportions when employed in conjunction with a layer 22 of pure silver. However, the deposition process is somewhat simplified by using the same source material to produce first and second barrier layers of identical composition. In this case source material of eutectic proportions will be required for forming a eutectic braze.

The coated helix 11 is located between its three support rods 13 and held in position by the support tube 12, and then the assembly is heated in vacuum or in an inert atmosphere to about 750° C. This is within the solidus-liquidus temperature range of copper-silver alloys. The temperature is maintained for about ten minutes to allow the titanium to migrate through into the surface of the boron nitride rods in the regions where those rods are in contact with the helix, and only then is the temperature raised to a temperature sufficient for the copper and silver layers to react to form a braze, which bonds the helix to the now metallized portions of the rods. Typically the proportion of silver to copper to titanium in the sputtered layers is 80:20:5 by weight. Concerning the relative proportions of silver and copper, this is slightly on the silver rich side of the silver copper eutectic so as to compensate for silver evaporation and thereby leave a eutectic braze. Under these conditions the brazing can be performed at a temperature of about 970° C.

In its application to the brazing of TWT slow-wave helices to ceramic support rods, this bonding method has the particular advantages that no silk screen or other form of masking is required, pitch changes and tapers can be accommodated as easily as uniform helices, no jigging is required to achieve and maintain registry of the helix turns with metallized areas on the rods during brazing, and, finally, the method is applicable to support rods made of boron nitride which is a material exhibiting desirable radio frequency properties, particular at high frequencies, and is difficult to braze by conventional methods. There is also the feature that with sputtering very precise control of layer thickness is readily achievable making possible highly reproduceable bonds within close dimensional tolerances.

In this TWT slow-wave structure application the layers are applied to the metal rather than to the ceramic in order to avoid the masking and jigging problems referred to above, but it should be evident that, where such considerations do not apply, other factors may make it preferable to apply the layers instead to the ceramic without departing from the scope of this invention.

For the particular application of bonding this fine pitch helix to boron nitride rods the silver copper eutectic braze, is preferred because it is a relatively low temperature braze and thus minimizes any distortion problems resulting from thermal expansion mismatch between the boron nitride and the molybdenum.

For other applications, where the range of temperature excursion is less important, non-eutectic brazes may be preferred, or brazes of different metals. Thus, for example, when brazing a flat metal article to a flat ceramic surface gold has been substituted for the silver, and the proportions changed for a gold copper eutectic. Zirconium may be substituted for the titanium an alternative active metal. It is also possible to dispense entirely with both the gold and the silver and instead to rely upon the copper forming a braze with some of the titanium of the active metal layer. Once again this requires the use of higher temperatures than is needed for the silver copper braze. Similarly a nickel can be substituted for the copper in order to form a metal titanium braze. This has magnetic properties making it not normally suitable for brazing TWT helices but can satisfactorily be used in other applications.

We claim:

1. A method of bonding a travelling wave tube slow wave helix to a plurality of ceramic support rods wherein a first metallic barrier layer is deposited by sputtering upon the slow wave helix, a layer of active metal in elemental form is deposited by sputtering upon the first barrier layer, and a second metallic barrier layer is deposited by sputtering upon the active metal layer; wherein the composition, extent and manner of deposition of the layers is such as to protect the active metal layer from general oxidation; wherein the composition of the barrier layers is such that on their own, or together with material of the active layer, they combine to form a braze that contains at least one of the elements gold, silver, copper, nickel; wherein the composition of the second barrier layer is selected from the group comprising an alloy, a composite layer whose components constitute the precursor of an alloy, and a layer that forms an alloy with the active metal; wherein the support rods are assembled in position around the slow wave helix and the resulting assembly is heated in vacuum or in an inert atmosphere to a temperature sufficient to cause at least some of the active metal to migrate through into the ceramic and metallize it; and wherein further heat is applied to cause the metal of the barrier layers to combine and form a braze joining the helix to the now metallized support rods.

2. A method according to claim 1, wherein the braze is a silver copper braze.

3. A method according to claim 2, wherein the braze is a substantially eutectic braze.

4. A method according to claim 1, wherein the support rods are made of boron nitride.

5. A method according to claim 4, wherein the braze is a silver copper braze.

6. A method according to claim 5, wherein the braze is a substantially eutectic braze.

* * * * *